(12) United States Patent
Brisson et al.

(10) Patent No.: US 6,821,086 B1
(45) Date of Patent: Nov. 23, 2004

(54) TURBOMACHINE SEAL ASSEMBLY AND METHOD THEREFOR

(75) Inventors: Bruce William Brisson, Galway, NY (US); Mark Edward Burnett, Buskirk, NY (US); David Alan Caruso, Ballston Lake, NY (US); Robert Edward Deallenbach, Schenectady, NY (US); James Harvey Vogan, Schenectady, NY (US); Christopher Edward Wolfe, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/250,088

(22) Filed: Jun. 3, 2003

(51) Int. Cl.$^7$ ................................................. F01D 11/00
(52) U.S. Cl. ........................... 415/174.2; 415/174.5; 277/411; 277/412
(58) Field of Search .................. 415/173.7, 174.2, 415/174.5, 230, 231; 277/411, 412, 416, 421

(56) References Cited

U.S. PATENT DOCUMENTS

| | | | |
|---|---|---|---|
| 4,415,309 A | 11/1983 | Atterbury | 415/170 |
| 4,756,536 A | 7/1988 | Belcher | 277/53 |
| 5,026,252 A | 6/1991 | Hoffelner | 415/174.2 |
| 5,351,971 A | 10/1994 | Short | 277/53 |
| 5,474,305 A | 12/1995 | Flower | 277/53 |
| 5,474,306 A | 12/1995 | Bagepalli et al. | 277/53 |
| 5,613,829 A | 3/1997 | Wolfe et al. | 415/174.1 |
| 5,749,584 A | 5/1998 | Skinner et al. | 277/53 |
| 6,065,754 A | 5/2000 | Cromer et al. | 277/412 |
| 6,131,910 A | 10/2000 | Bagepalli et al. | 277/355 |
| 6,168,377 B1 | 1/2001 | Wolfe et al. | 415/174.2 |
| 6,250,640 B1 | 6/2001 | Wolfe et al. | 277/355 |
| 6,250,641 B1 | 6/2001 | Dinc et al. | 277/355 |
| 6,431,827 B1 | 8/2002 | Wolfe et al. | 415/173.3 |
| 6,517,314 B1 | 2/2003 | Burnett et al. | 415/173.7 |
| 6,558,118 B1 * | 5/2003 | Brisson et al. | 415/173.7 |
| 2001/0007384 A1 | 7/2001 | Skinner et al. | 277/355 |
| 2002/0071764 A1 | 6/2002 | Turnquist et al. | 415/173.3 |
| 2002/0074729 A1 | 6/2002 | Aksit et al. | 277/355 |
| 2002/0105145 A1 | 8/2002 | Aksit et al. | 277/355 |

* cited by examiner

*Primary Examiner*—F. Daniel Lopez
*Assistant Examiner*—Kimya N McCoy
(74) *Attorney, Agent, or Firm*—Ernest Cusick; Gary M. Hartman; Domenica N. S. Hartman

(57) ABSTRACT

A seal assembly and method for a turbomachine having a rotary member and a stationary member circumscribing the rotary member. The seal assembly comprises an annular-shaped platform on the rotary member so as to be disposed at an outer circumferential region thereof. The platform is supported radially outward from the rotary member so as to project beyond axially-adjacent regions of the rotary member. The platform has a contact region radially separated from the rotary member by a cavity. A sealing member is disposed at a radially inward region of the stationary member, with a portion of the sealing member in rubbing contact with the contact region.

40 Claims, 2 Drawing Sheets

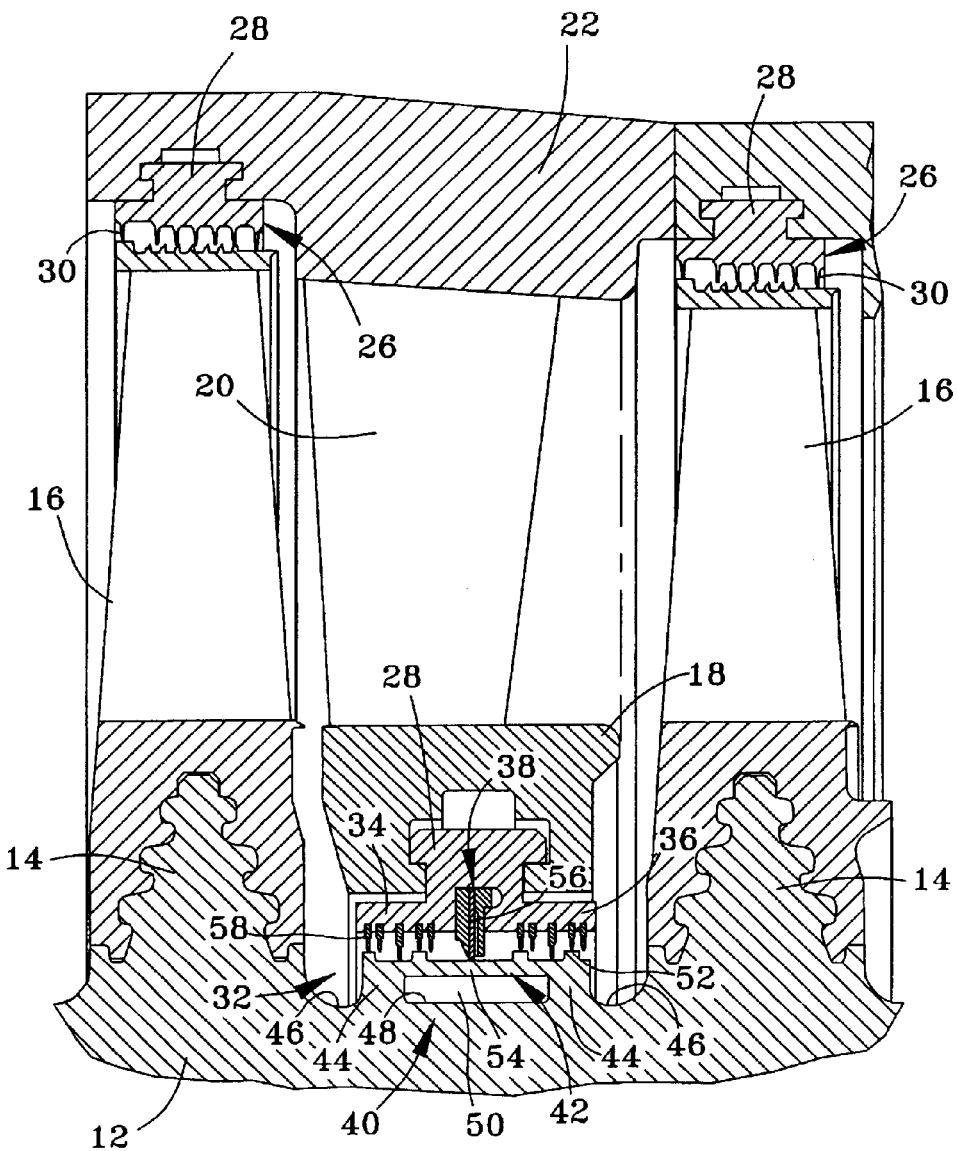
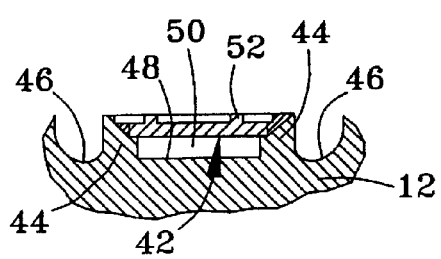
FIG.3
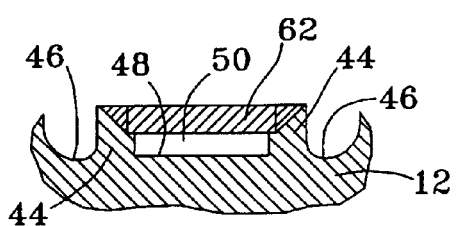
FIG.4
FIG.5

TURBOMACHINE SEAL ASSEMBLY AND METHOD THEREFOR

BACKGROUND OF INVENTION

1. Field of the Invention

The present invention generally relates to dynamic seals of the type used in turbomachinery. More particularly, this invention relates to a seal assembly comprising a seal and a platform mounted, respectively, to non-rotating and rotating components of a turbomachine, wherein the platform is adapted to promote the dissipation of heat produced by rubbing contact between the seal and platform.

2. Description of the Related Art

Labyrinth-type packings and brush seals are widely used in steam turbines and in aircraft and industrial gas turbines to provide dynamic seals between the rotating and static turbine components, such as the rotor and diaphragm inner web of a steam turbine. Traditional labyrinth packing comprises a series of teeth that project radially inward from the circumference of a static component and toward but out of contact with the rotary component, thereby defining a series of partial barriers that create a tortuous axial flow path immediately adjacent the surface of the rotary component. Brush seals typically comprise metal bristles that, similar to the teeth of a labyrinth packing, project radially inward from the circumference of a static component toward a rotary component. In contrast to labyrinth packings, brush seals are normally intended to be in rubbing contact with the adjacent circumferential surface of the rotary component, creating a substantially continuous barrier to flow around the circumference of the rotary component. In this regard, brush seals provide a more effective barrier to secondary flow losses, i.e., provide better sealing performance, as compared to labyrinth packings, and therefore have the potential for significantly improving section performance.

The rotors of aircraft and industrial gas turbines are relatively stiff, and as a result their dynamic behavior is not generally affected by rubbing contact with a brush seal. In contrast, the rotor of a steam turbine typically includes a continuous solid shaft to which buckets are attached. Impulse-type steam turbines typically operate above the rotor's first bending critical frequency, and often near the second bending critical frequency. It has been shown that the rubbing contact between a brush seal and the rotor of a steam turbine can magnify rotor vibration through the first and second critical speeds of a rotor, resulting in unacceptable radial rotor movement. It is believed that this effect is particularly likely to occur if the rotor is bowed as a result of thermal, dynamic or manufacturing circumstances. More particularly, the friction resulting from the rubbing contact locally increases the surface temperature of the rotor, leading to nonuniform surface temperatures along its circumference. Because high (proud) spots of a bowed rotor are particularly prone to heating in this manner from more intense rubbing contact, the localized heating caused by brush seals can further increase bowing in a rotor as a result of nonuniform thermal expansion about the rotor circumference, thereby exacerbating vibration and rotor dynamics concerns.

Various solutions to the above problem have been proposed. For example, brush seals have been installed in steam turbines with an initial clearance sized to ensure that their bristles do not contact the rotor during start-up, when there is a lack of adequate cooling flow that would otherwise reduce the degree of localized heating. While such an approach can eliminate or at least significantly reduce rotor dynamics concerns associated with brush seals, sealing performance is compromised. In commonly-assigned U.S. Pat. No. 6,168,377, a brush seal assembly includes an annular-shaped insert located in a circumferential groove in the rotor surface. The bristles of the brush seal are aligned to be in rubbing contact with the insert, such that heat generated by rubbing contact with the bristles is better distributed and dissipated by the insert. Another solution posed by commonly-assigned U.S. Pat. No. 6,517,314 is to position the brush seals in rubbing contact with platforms formed on the bucket dovetails, such that rubbing contact occurs at a location spaced radially outward from the outer diameter of the rotor shaft, thus eliminating localized heating at the rotor surface.

While the above approaches to reducing localized rotor heating have been proven to be effective, the use of brush seals in steam turbines has remained limited by rotor-dynamic constraints associated with localized heating of the rotor. As a consequence, in the diaphragm packing area of a steam turbine, brush seals have been limited by the number of stages in which they can be installed without inducing unacceptable radial rotor movement. The result is decreased section efficiency due to the increased secondary flow losses associated with the labyrinth packings that must be used instead of brush seals.

In view of the above, it would be desirable if alternative approaches were available for reducing vibration and rotor dynamics concerns arising from the localized heating caused by brush seals, such that brush seals can be used in essentially all stages within the diaphragm packing area of a steam turbine.

SUMMARY OF INVENTION

The present invention provides a seal assembly and method therefor that is capable of significantly reducing vibration and rotor dynamics concerns that arise in turbomachinery, such as steam turbines, as a result of localized heating caused by seals in rubbing contact with a rotary member of a turbomachine. The invention enables such seals, including brush seals, to be installed in essentially all stages within the diaphragm packing area of a steam turbine.

In view of the above, the present invention finds application with a turbomachine having a rotary member rotatable about an axis and a stationary member circumscribing the rotary member. The rotary member has an outer circumferential region disposed in a plane normal to the axis thereof and the stationary member having a portion radially extending toward the rotary member so that the stationary member has a radially inward surface region facing the outer circumferential region of the rotary member. The seal construction of this invention entails a seal assembly comprising an annular-shaped platform on the rotary member so as to be disposed at the outer circumferential region thereof. The platform is supported radially outward from the rotary member so as to project radially outward beyond axially-adjacent outer surface regions of the rotary member. Furthermore, the platform has a contact region radially separated from the rotary member by a cavity therebetween. A sealing member is disposed at the radially inward surface region of the stationary member, with a portion of the sealing member being in rubbing contact with the contact region of the platform. As a result of being spaced apart from the rotary member, with a cavity axially separating the contact region of the platform from the rotary member, the platform is effective to distribute and dissipate heat generated by rubbing contact with the sealing member.

The present invention also provides a method of providing a seal assembly for a turbomachine of the type described above. The method comprises the steps of providing the annular-shaped platform on the rotary member so as to be disposed at the outer circumferential region thereof, such that the platform is supported radially outward from the rotary member, projects radially outward beyond axially-adjacent outer surface regions of the rotary member, and has a contact region radially separated from the rotary member by a cavity therebetween. The sealing member is provided at the radially inward surface region of the stationary member, so that a portion of the sealing means is in rubbing contact with the contact region of the platform. Again, as a result of being spaced apart from the rotary member with a cavity therebetween, the platform is effective to distribute and dissipate heat generated by rubbing contact with the sealing member as the rotary member rotates about its axis.

In view of the above, it can be seen that a significant advantage of this invention is that the platform is configured to promote the distribution and dissipation of heat generated as a result of rubbing contact with a seal. More particularly, the platform is able to conduct heat axially from the contact area toward the ribs, thereby better distributing frictional heating that would otherwise cause a localized rise in temperature in a relatively limited surface region of a rotary member, in which case nonuniform surface temperatures and bowing of the rotary member could occur. Vibration and rotor dynamics concerns can be sufficiently reduced with the present invention to the extent that brush seals can potentially be used in every stage within the diaphragm packing area of a steam turbine, limited only be the particular brush seal design. The platform is preferably fabricated to be symmetrical about the axis of the rotary member, so as not to affect vibrational characteristics. The platform can also be configured to be well-adapted for field installation, as well as for use in original production.

Other objects and advantages of this invention will be better appreciated from the following detailed description.

BRIEF DESCRIPTION OF DRAWINGS

FIG. 2 represents a fragmentary longitudinal cross-sectional view of a diaphragm packing area of a steam turbine equipped with a sealing assembly in accordance with a particular embodiment of this invention.

FIG. 3 is a more detailed representation of a platform shown as part of the sealing assembly of FIG. 2.

FIGS. 4 and 5 are two views showing an intermediate stage in the fabrication of the platform of FIGS. 2 and 3.

DETAILED DESCRIPTION

Figure 1:
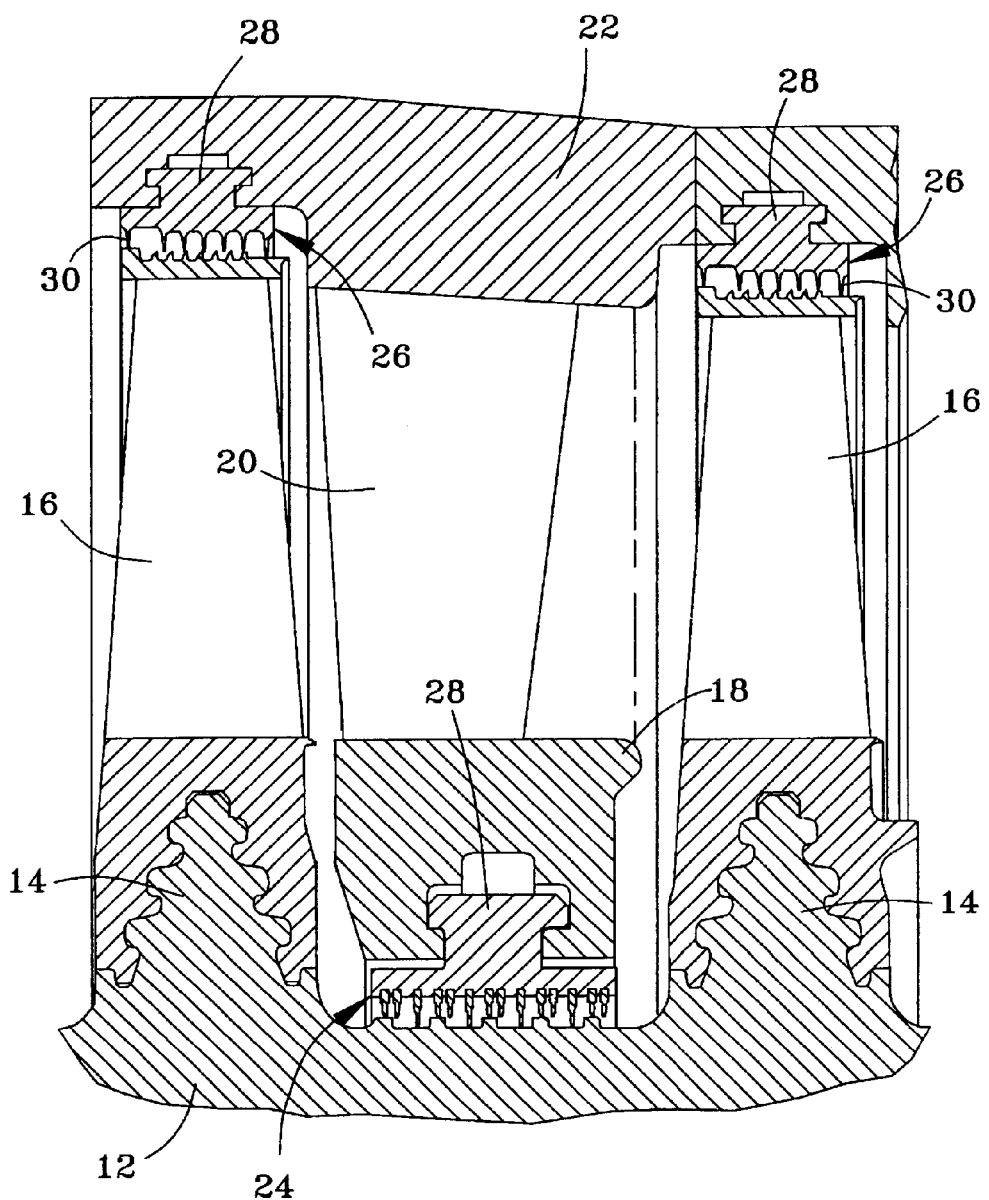
FIG. 1 represents a fragmentary longitudinal cross-sectional view of a diaphragm packing area of a steam turbine in accordance with the prior art.

FIG. 1 represents the diaphragm packing area of a steam turbine 10 equipped with labyrinth packings 24 and 26 in accordance with conventional practice. The steam turbine 10, which may be of the impulse type, has a rotor 12 on which axially-spaced wheels 14 are formed or mounted, and to which buckets 16 are attached in a conventional manner. The rotor 12 is represented as a continuous and unitary member, as opposed to a typical gas turbine rotor made up of wheels and disks bolted to one another. The rotor 12, wheels 14 and buckets 16 rotate about an axis (not shown) of the rotor 12, and thereby form part of a rotary portion of the turbine 10. A diaphragm inner web 18 radially extends inward between the wheels 14, defining separate stages of the turbine 10. A casing 22 surrounds the rotor 12, and with the web 18 supports a nozzle partition 20. The web 18, partition 20 and casing 22 together form part of a stationary portion of the turbine 10, and surround an outer circumferential region of the rotor 12 that is disposed in a plane normal to the rotor axis. As indicated by an arrow, steam flows through the buckets 16 and partition 20.

The turbine 10 is depicted in FIG. 1 as being equipped with labyrinth packings 24 and 26, each of which is mounted to a packing ring segment 28. As is conventional, each packing ring segment 28 is one of multiple arcuate segments that are assembled circumferentially to the rotor 12 or casing 22. The labyrinth packings 24 and 26 reduce secondary flow losses between the rotary and stationary components, more particularly, between the rotor 12 and web 18 and between the buckets 16 and casing 22. While effective and widely used, the labyrinth packings 24 and 26 cannot reduce secondary flow losses to the extent possible with brush seals because of the gap between the teeth 30 of the labyrinth packings 24 and 26 and the opposing surfaces with which they seal.

FIG. 2 represents the same turbine 10 illustrated in FIG. 1, but modified to so that the packing ring segment 28 mounted to the web 18 carries the stationary portion of a seal assembly 32 that includes a brush seal 38 situated axially between sets of labyrinth packings 34 and 36, in accordance with an embodiment of the present invention. The labyrinth packings 34 and 36 serve as backup seals to the brush seal 38, and are therefore preferred but optional in this invention. In contrast to the packings 34 and 36, the brush seal 38 is adapted to continuously contact the surface with which it is intended to seal, thereby effecting a better seal than possible with the labyrinth packing 24 it replaced. As is conventional, the brush seal 38 and labyrinth packings 34 and 36 are depicted as being equipped with bristles 56 and teeth 58, respectively, that project radially toward the rotor 12. As known in the art, the bristles 56 and teeth 58 may be formed of a variety of materials.

Rubbing contact that occurs with the brush seal 38 inherently causes frictional heating that, if not addressed, can lead to nonuniform heating along the circumference of the rotor 12, with the adverse potential for magnifying rotor vibrations of the rotor 12. Better distribution and dissipation of this heat are achieved with the present invention by modifying the rotor 12 to have a raised section 40, shown in FIG. 2 and in greater detail in FIG. 3. The raised section 40, which in effect constitutes the rotating portion of the seal assembly 32, projects radially outward beyond axially adjacent surface regions 46 of the rotor 12. The raised section 40 is depicted as comprising a platform 42 supported above a surface region 48 of the rotor 12 by a pair of support ribs 44. An individual rib 44 is shown as being located at each of the axial extremities of the platform 42, though other configurations are possible, including the inclusion of additional ribs 44. The platform 43 and ribs 44 are preferably continuous along the entire circumference of the rotor 12, such that the raised section 40 is symmetrical about the axis of the rotor 12 and will not affect its vibrational characteristics. With the rotor surface region 48, the platform 42 and support ribs 44 define a cavity 50 that is preferably completely enclosed, such that the cavity 50 contains only air that was trapped during construction of the raised section 40.

The platform 42 is shown as being equipped with ribs 52 on its outer radial surface, providing what is termed a high-low sealing arrangement with teeth 58 of each of the labyrinth packings 34 and 36. As evident from FIGS. 2 and 3, the platform 42 also provides a contact area 54 that is continuously in rubbing contact with the bristles 56 of the brush seal 38. With the configuration of the raised section 40 shown in FIGS. 2 and 3, the contact area 54 is located approximately midway between the ribs 44, such that heat generated by rubbing contact with the brush seal 38 is conducted away from the contact area 54 in both the fore and aft axial directions before being conducted radially inward to the rotor 12. The cavity 50 acts as a thermal barrier, such that heat is not transferred by conduction directly to the surface region 48 of the rotor 12 beneath the platform 42, but instead is limited to radiation heat transfer. As such, heat generated by the brush seal 38 is not localized in a limited circumferential surface region of the rotor 12, thereby drastically reducing if not preventing rotor-dynamic instability problems caused or exacerbated by localized rotor heating when the steam turbine rotor 12 is operated near one of its critical bending frequencies.

According to one aspect of the invention, the support ribs 44 can be machined directly into the original rotor forging, with a pair of ribs 44 being located at each of the packing areas of the rotor 12. Multiple arcuate-shaped inserts 62 are then welded to each other and to each set of ribs 44, as represented in FIGS. 4 and 5, followed by machining of the inserts 62 to form the platform 42 and its ribs 52. Such an operation can be performed during the original production of the rotor 12, or as an in-field modification of an existing rotor 12. Various known welding techniques can be used to fabricate the raised section 40, depending on the materials being welded. Suitable materials for the platform 42 (and therefore the inserts 62 from which the platform 42 is fabricated) are those that can be reliably welded to the rotor 12 and have similar thermal expansion properties to those of the rotor 12, the latter of which avoids high thermal stresses and platform bending. In view of these considerations, for a rotor 12 formed of a chromium-molybdenum-vanadium alloy, a suitable material for the platform 42 would be the same or similar chromium-molybdenum-vanadium alloy.

While the invention has been described in terms of a particular embodiment, it is apparent that other forms could be adopted by one skilled in the art. For example, while the invention has been described in reference to a steam turbine, the invention can find application in other types of turbomachinery. Therefore, the scope of the invention is to be limited only by the following claims.

What is claimed is:

1. A seal assembly for a turbomachine having a rotary member rotatable about an axis and a stationary member circumscribing the rotary member, the rotary member having an outer circumferential region disposed in a plane normal to the axis thereof and the stationary member having a portion radially extending toward the rotary member so that the stationary member has a radially inward region facing the outer circumferential region of the rotary member, the seal assembly comprising:

an annular-shaped platform on the rotary member so as to be disposed at the outer circumferential region thereof, the platform being supported radially outward from the rotary member so as to project radially outward beyond axially-adjacent outer surface regions of the rotary member, the platform having a contact region radially separated from the rotary member by a cavity therebetween; and sealing means disposed at the radially inward region of the stationary member and having a portion thereof in rubbing contact with the contact region of the platform, the platform being effective to distribute and dissipate heat generated by rubbing contact with the sealing means.

2. The seal assembly according to claim 1, wherein the sealing means comprises a brush seal.

3. The seal assembly according to claim 1, wherein the platform is supported radially outward from the rotary member by at least a first rib spaced in a first axial direction from the contact region and by at least a second rib spaced in an oppositely-disposed second axial direction from the contact region.

4. The seal assembly according to claim 3, wherein the platform is welded to the first and second ribs.

5. The seal assembly according to claim 3, wherein each of the first and second ribs is continuous along the outer circumferential region of the rotary member.

6. The seal assembly according to claim 3, wherein the cavity is delineated by the platform, the rotary member, and the first and second ribs.

7. The seal assembly according to claim 1, wherein the cavity is entirely enclosed.

8. The seal assembly according to claim 1, wherein the cavity contains only air.

9. The seal assembly according to claim 1, further comprising a labyrinth packing disposed at the radially inward region of the stationary member and spaced axially from the portion of the sealing means.

10. The seal assembly according to claim 9, further comprising raised surface regions on a radially-outward surface of the platform, the labyrinth packing comprises teeth that extend radially inward toward the raised surface regions.

11. The seal assembly according to claim 1, wherein the seal assembly is installed on the turbomachine.

12. The seal assembly according to claim 1, wherein the turbomachine is a steam turbine.

13. A turbomachine comprising:

a rotor rotatable about an axis and having an outer circumferential region disposed in a plane normal to the axis;

a diaphragm web circumscribing the rotor, the diaphragm web having a portion radially extending toward the rotor so that the diaphragm web has a radially inward region facing the outer circumferential region of the rotor;

a continuous annular-shaped platform on the rotor so as to be disposed at the outer circumferential region thereof, the platform being supported radially outward from a first circumferential surface of the rotor so as to project radially outward beyond and between axially-adjacent second circumferential surfaces of the rotor, the platform having a contact region radially separated from the first circumferential surface of the rotor by a cavity therebetween; and a brush seal disposed at the radially inward region of the diaphragm web and in rubbing contact with the contact region of the platform, the platform being effective to distribute and dissipate heat generated by rubbing contact with the brush seal.

14. The turbomachine according to claim 13, wherein the platform is supported radially outward from the rotor by a first rib spaced in a first axial direction from the contact region and by a second rib spaced in an oppositely-disposed second axial direction from the contact region.

15. The turbomachine according to claim 14, wherein the first and second ribs are machined features of the rotor, and the platform is welded to the first and second ribs.

16. The turbomachine according to claim 14, wherein each of the first and second ribs is continuous along the outer circumferential region of the rotor.

17. The turbomachine according to claim 14, wherein the cavity is delineated and entirely enclosed by the platform, the first circumferential surface of the rotor, and the first and second ribs.

18. The turbomachine according to claim 13, wherein the cavity is entirely enclosed and contains only air.

19. The turbomachine according to claim 13, further comprising a labyrinth packing disposed at the radially inward region of the diaphragm web and spaced axially from the brush seal.

20. The turbomachine according to claim 13, wherein the turbomachine is a steam turbine having a diaphragm packing area, and the platform and brush seal are installed in each stage within the diaphragm packing area of the steam turbine.

21. A method of providing a seal assembly for a turbomachine having a rotary member rotatable about an axis and a stationary member circumscribing the rotary member, the rotary member having an outer circumferential region disposed in a plane normal to the axis thereof and the stationary member having a portion radially extending toward the rotary member so that the stationary member has a radially inward region facing the outer circumferential region of the rotary member, the method comprising the steps of:

provided an annular-shaped platform on the rotary member so as to be disposed at the outer circumferential region thereof, the platform being supported radially outward from the rotary member so as to project radially-outward beyond axially-adjacent outer surface regions of the rotary member, the platform having a contact region radially separated from the rotary member by a cavity therebetween; and providing sealing means at the radially inward region of the stationary member, the sealing means having a portion thereof in rubbing contact with the contact region of the platform, the platform distributing and dissipating heat generated by rubbing contact with the sealing means as the rotary member rotates about the axis thereof.

22. The method according to claim 21, wherein the platform is supported radially outward from the rotary member by at least a first rib spaced in a first axial direction from the contact region and by at least a second rib spaced in an oppositely-disposed second axial direction from the contact region.

23. The method according to claim 22, further comprising the step of welding the platform to the first and second ribs.

24. The method according to claim 23, wherein each of the first and second ribs are formed on the rotary member to be continuous along the outer circumferential region thereof.

25. The method according to claim 23, wherein the platform, the rotary member, and the first and second ribs are fabricated on the rotary member so as to delineate the cavity.

26. The method according to claim 21, wherein the platform is fabricated on the rotary member so that the cavity is entirely enclosed.

27. The method according to claim 21, wherein the platform is fabricated on the rotary member so that the cavity contains only air.

28. The method according to claim 21, further comprising the step of providing a labyrinth packing disposed at the radially inward region of the stationary member and spaced axially from the sealing means.

29. The method according to claim 28, further comprising the step of forming raised surface regions on a radially-outward surface of the platform, the labyrinth packing comprising teeth that extend radially inward toward the raised surface regions.

30. The method according to claim 21, wherein the method is performed while the rotary member is installed on the turbomachine.

31. The method according to claim 21, wherein the turbomachine is a steam turbine.

32. A method of installing a seal assembly in a turbomachine having a rotor rotatable about an axis and a diaphragm web circumscribing the rotor, the rotor having an outer circumferential region disposed in a plane normal to the axis thereof and the diaphragm web having a portion radially extending toward the rotor so that the diaphragm web has a radially inward region facing the outer circumferential region of the rotor, the method comprising the steps of:

fabricating a continuous annular-shaped platform on the rotor so that the platform is disposed at the outer circumferential region thereof and is supported radially outward from a first circumferential surface of the rotor so as to project radially outward beyond and between axially-adjacent second circumferential surfaces of the rotor, the platform having a contact region radially separated from the first circumferential surface by a cavity therebetween; and installing a brush seal at the radially inward region of the diaphragm web so that bristles of the brush seal are in rubbing contact with the contact region of the platform, the platform distributing and dissipating heat generated by rubbing contact with the brush seal as the rotor rotates about the axis thereof.

33. The method according to claim 32, further comprising the step of forming first and second ribs on the rotor that support the platform radially outward from the first circumferential surface of the rotor, the first rib being spaced in a first axial direction from the contact region and the second rib being spaced in an oppositely-disposed second axial direction from the contact region.

34. The method according to claim 33, further comprising the steps of machining the rotor to form the first and second ribs, and welding the platform to the first and second ribs.

35. The method according to claim 33, wherein each of the first and second ribs is formed to be continuous along the outer circumferential region of the rotor.

36. The method according to claim 33, wherein the platform, the first circumferential surface of the rotor, and the first and second ribs are fabricated so as to delineate and entirely enclose the cavity.

37. The method according to claim 32, wherein the cavity is formed so as to be entirely enclosed and contain only air.

38. The method according to claim 32, further comprising the step of installing a labyrinth packing at the radially inward region of the diaphragm web and spaced axially from the brush seal.

39. The method according to claim 38, further comprising the step of machining raised surface regions on a radially-outward surface of the platform so that installation of the labyrinth packing results in teeth of the labyrinth packing extending radially inward toward the raised surface regions.

40. The method according to claim 32, wherein the turbomachine is a steam turbine having a diaphragm packing area, and the platform and brush seal are installed in each stage within the diaphragm packing area of the steam turbine.

* * * * *